United States Patent
Burke et al.

(10) Patent No.: US 9,557,933 B1
(45) Date of Patent: *Jan. 31, 2017

(54) SELECTIVE MIGRATION OF PHYSICAL DATA

(71) Applicant: EMC Corporation, Hopkinton, MA (US)

(72) Inventors: Barry A. Burke, Tyngsboro, MA (US); Amnon Naamad, Brookline, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/547,386

(22) Filed: Nov. 19, 2014

Related U.S. Application Data

(63) Continuation of application No. 12/924,345, filed on Sep. 24, 2010, now Pat. No. 8,924,675.

(51) Int. Cl.
*G06F 3/06* (2006.01)

(52) U.S. Cl.
CPC ............ *G06F 3/065* (2013.01); *G06F 3/0617* (2013.01); *G06F 3/0683* (2013.01)

(58) Field of Classification Search
CPC .... G06F 9/45558; G06F 3/067; G06F 3/0647; G06F 2009/4557; G06F 3/0665; G06F 9/45533; G06F 9/5077; G06F 3/0631; G06F 3/065; G06F 11/203; G06F 11/2058

See application file for complete search history.

(56) References Cited

U.S. PATENT DOCUMENTS

| | | | | |
|---|---|---|---|---|
| 7,711,916 | B2* | 5/2010 | Chandrasekaran ... | G06F 3/0605 707/812 |
| 2004/0199744 | A1* | 10/2004 | Bolik .................... | G06F 3/0619 711/220 |
| 2004/0260873 | A1* | 12/2004 | Watanabe ........... | G06F 11/2058 711/162 |
| 2007/0239944 | A1* | 10/2007 | Rupanagunta ........ | G06F 3/0613 711/147 |
| 2010/0332401 | A1* | 12/2010 | Prahlad ............... | G06F 17/3002 705/80 |
| 2011/0197039 | A1* | 8/2011 | Green ................... | G06F 3/0617 711/162 |
| 2012/0030343 | A1* | 2/2012 | Ryder ................... | G06F 9/4856 709/224 |

\* cited by examiner

*Primary Examiner* — Reginald Bragdon
*Assistant Examiner* — Thanh Vo
(74) *Attorney, Agent, or Firm* — Muirhead and Saturnelli, LLC

(57) ABSTRACT

The system described herein allows for picking data to be moved from one physical location to another using certain criteria, such as expected activity level, to achieve load balancing or load optimization. Migrating data for a logical device includes subdividing the logical device into subsections, where each of the subsections corresponds to a particular address range of the logical device that is mapped to a physical device containing corresponding data and copying data for a first subsection from a first physical device to a second, different, physical device, where data for a second subsection is maintained indefinitely on the first physical device after copying the data for the first subsection to the second physical device. The first physical device may be provided in a different geographic location than the second physical device.

20 Claims, 6 Drawing Sheets

SELECTIVE MIGRATION OF PHYSICAL DATA

CROSS-REFERENCE TO RELATED APPLICATIONS

This application is a continuation of U.S. application Ser. No. 12/924,345 filed on Sep. 24, 2010 now U.S. Pat. No. 8,924,675, which is incorporated by reference herein.

BACKGROUND OF THE INVENTION

1. Technical Field

This application relates to computer storage devices, and more particularly to the field of migrating data between storage devices.

2. Description of Related Art

Host processor systems may store and retrieve data using a storage device containing a plurality of host interface units (host adapters), disk drives and other physical storage, and disk interface units (disk adapters). Such storage devices are provided, for example, by EMC Corporation of Hopkinton, Mass., and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the physical storage of the storage device directly, but rather, access what appears to the host systems as a plurality of logical volumes. The logical volumes may or may not correspond to the actual disk drives and/or other physical storage.

Data storage capabilities from multiple locations and multiple physical storage devices may be integrated to present the user with a somewhat unified data schema with storage resources that a user accesses transparently and somewhat independently from the actual hardware/location used for the storage. For example, a data storage cloud may appear to an end user as a single storage system even though the data may actually be stored on a number of different storage systems that may be provided in different locations and/or may use different storage hardware. The user would see a plurality of logical storage units (LUNs) but may not know (or care) about the underlying physical storage supporting the LUNs.

In some cases, the particular location used for physical storage for particular LUNs may be optimized based on one or more criteria. For example, if physical storage is provided using two separate locations, a user may manually select one of the locations any number of reasons, such as proximity to computing resources, cost, etc. Once the initial selection is made, the user may then access the LUN without regard to the underlying physical storage. Of course, automated systems may select the underlying physical storage automatically and without user intervention using some of the same or similar criteria.

However, there may be competing criteria that result in it being desirable to provide underlying physical storage at one location for some of the time while providing the underlying physical storage at one or more other locations at different times. For example, it may be desirable to provide employee records at a first location because the storage costs are relatively low, but it may be desirable to have the records at a second (different) location once a week where payroll processing is performed. The data may be moved manually by a user prior to and after each payroll processing or may be moved by an automated process that anticipates the processing at the second location each week. In either case though, all of the employee data (e.g., the entire LUN) may be moved from the first to the second location (and back) even if only a small portion of it is needed each week for payroll processing.

Accordingly, it is desirable to provide a system that avoids having to move/locate large portions of data when it is optimal to move only small portions.

SUMMARY OF THE INVENTION

According to the system described herein, migrating data for a logical device includes subdividing the logical device into subsections, where each of the subsections corresponds to a particular address range of the logical device that is mapped to a physical device containing corresponding data and copying data for a first subsection from a first physical device to a second, different, physical device, where data for a second subsection is maintained indefinitely on the first physical device after copying the data for the first subsection to the second physical device. The first physical device may be provided in a different geographic location than the second physical device. The subsections may be extents and each of the extents may include information that maps logical address space into physical address space. Automated algorithms may be used to determine data in the first subsection. The automated algorithms may use expected activity level to determine data in the first subsection. Data in the first subsection may be copied back to the first physical device. A data management device may present data to an external device in a way that is independent of the physical location of the data. The external device may be a host coupled to the data management device.

According further to the system described herein, computer software, provided in a non-transitory computer-readable medium, migrates data for a logical device. The software includes executable code that accesses subsections of the logical device, where each of the subsections corresponds to a particular address range of the logical device that is mapped to a physical device containing corresponding data and executable code that copies data for a first subsection from a first physical device to a second, different, physical device, where data for a second subsection is maintained indefinitely on the first physical device after copying the data for the first subsection to the second physical device. The first physical device may be provided in a different geographic location than the second physical device. The subsections may be extents and each of the extents may include information that maps logical address space into physical address space. Automated algorithms may be used to determine data in the first subsection. The automated algorithms may use expected activity level to determine data in the first subsection. The software may also include executable code that copies data in the first subsection back to the first physical device. A data management device may present data to an external device in a way that is independent of the physical location of the data. The external device may be a host coupled to the data management device.

According further to the system described herein, a system includes a first storage device, a second storage device coupled to the first storage device, and at least one data management device, coupled to at least the first storage device, where the data management device includes computer software that migrates data for a logical device. The software includes executable code that accesses subsections of the logical device, where each of the subsections corresponds to a particular address range of the logical device that is mapped to physical storage containing corresponding data. The software also includes executable code that copies data for a first subsection from the physical storage of the first storage device to physical storage of the second storage device, where physical data for a second subsection is maintained indefinitely on the first storage device after copying the data for the first subsection to the second storage device. The first storage device may be provided in a different geographic location than the second storage device. The subsections may be extents and each of the extents may include information that maps logical address space into physical address space. Automated algorithms may be used to determine data in the first subsection. The automated algorithms may use expected activity level to determine data in the first subsection. The data management device may present data to an external device in a way that is independent of the physical location of the data. The external device may be a host coupled to the data management device.

BRIEF DESCRIPTION OF DRAWINGS

Embodiments of the system are described with reference to the several figures of the drawings, noted as follows.

DETAILED DESCRIPTION OF VARIOUS EMBODIMENTS

Figure 1:
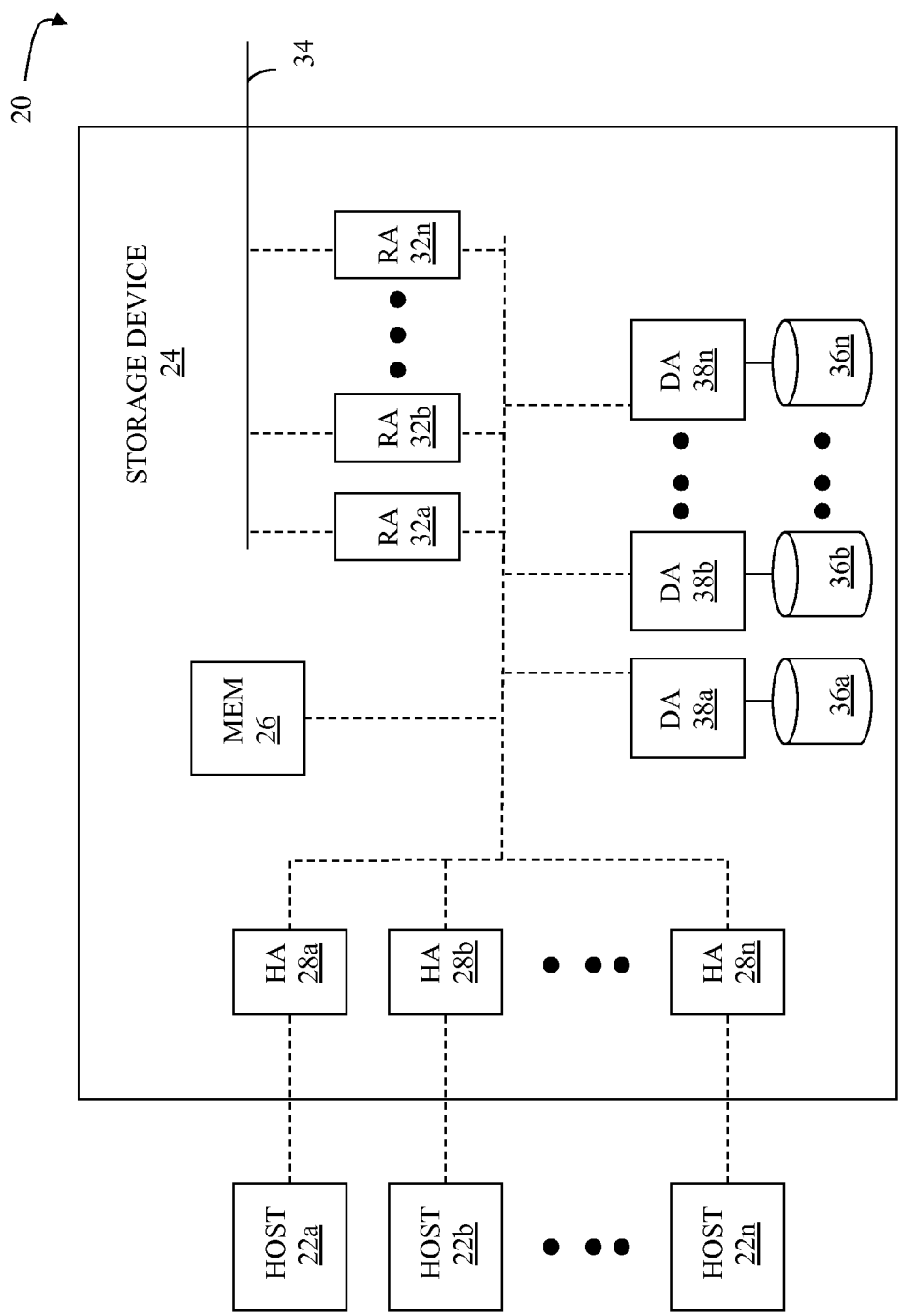
FIG. 1 is a schematic diagram showing a plurality of hosts and a data storage device that may be used in connection with the system described herein.

Referring now to the figures of the drawing, the figures comprise a part of this specification and illustrate exemplary embodiments of the described system. It is to be understood that in some instances various aspects of the system may be shown schematically or may be exaggerated or altered to facilitate an understanding of the system.

Referring to FIG. 1, a diagram 20 shows a plurality of hosts 22a-22n coupled to a data storage device 24. The data storage device 24 includes an internal memory 26 that facilitates operation of the storage device 24 as described elsewhere herein. The data storage device also includes a plurality of host adapters (HAs) 28a-28n that handle reading and writing data between the hosts 22a-22n and the storage device 24. Although the diagram 20 shows each of the hosts 22a-22n coupled to each of the HAs 28a-28n, it will be appreciated by one of ordinary skill in the art that one or more of the HAs 28a-28n may be coupled to other hosts and that one of the hosts 22a-22n may be coupled to more than one of the HAs 28a-28n.

The storage device 24 may include one or more Remote Data Facility (RDF) adapter units (RAs) 32a-32n. An RDF product, such as produced by EMC Corporation of Hopkinton, Mass., may be used to copy data from one storage device to another. For example, if a host writes data to a first storage device (e.g., a local storage device), it may be desirable to copy that data to a second storage device provided in a different location (e.g., a remote storage device). The RAs 32a-32n are coupled to an RDF link 34 and the RAs 32a-32n are similar to the HAs 28a-28n, but are used to transfer data between the storage device 24 and other storage devices (not shown) that are also coupled to the RDF link 34. The storage device 24 may be coupled to additional RDF links (not shown in FIG. 1) in addition to the RDF link 34. For further discussion of RDF and the use thereof in data recovery and storage techniques, see U.S. Pat. No. 5,742,792, which is incorporated by reference herein, and U.S. Patent App. Pub. No. 2006-0069887 to LeCrone, et al., entitled "Triangular Asynchronous Replication," which is incorporated herein by reference.

The storage device 24 may also include one or more disk drives 36a-36n (disk assemblies), each containing a different portion of data stored on the storage device 24. The disk drives 36a-36n should be understood as representing any appropriate type of storage media, including, without limitation, DRAM cache, flash or other solid-state storage device, tape, optical media, and/or any combination of permanent, semi-permanent and temporally-limited storage media. Each of the disk drives 36a-36n may be coupled to a corresponding one of a plurality of disk adapter units (DA) 38a-38n that provides data to a corresponding one of the disk drives 36a-36n and receives data from a corresponding one of the disk drives 36a-36n. Note that, in some embodiments, it is possible for more than one disk drive to be serviced by a DA and that it is possible for more than one DA to service a particular disk drive.

The storage space in the storage device 24 that corresponds to the disk drives 36a-36n may be subdivided into a plurality of volumes or logical storage devices. The logical storage devices may or may not correspond to the physical storage space of the disk drives 36a-36n. Thus, for example, the disk drive 36a may contain a plurality of logical storage devices or, alternatively, a single logical storage device could span both of the disk drives 36a, 36b. The hosts 22a-22n may be configured to access any combination of logical storage devices independent of the location of the logical storage devices on the disk drives 36a-36n. A device, such as a logical storage device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk drive. Other embodiments may use different structures.

One or more internal logical data path(s) exist between the DAs 38a-38n, the HAs 28a-28n, the RAs 32a-32n, and the memory 26. In some embodiments, one or more internal busses and/or communication modules may be used. In some embodiments, the memory 26 may be used to facilitate data transferred between the DAs 38*a*-38*n*, the HAs 28*a*-28*n* and the RAs 32*a*-32*n*. The memory 26 may contain tasks that are to be performed by one or more of the DAs 38*a*-38*n*, the HAs 28*a*-28*n* and the RAs 32*a*-32*n*, and a cache for data fetched from one or more of the disk drives 36*a*-36*n*. Use of the memory 26 is described in more detail hereinafter.

The storage device 24 may be provided as a stand-alone device coupled to the hosts 22*a*-22*n* as shown in FIG. 1 or, alternatively, the storage device 24 may be part of a storage area network (SAN) that includes a plurality of other storage devices as well as routers, network connections, etc. The storage device 24 may be coupled to a SAN fabric and/or be part of a SAN fabric. The storage device 24 may be a NAS. The system described herein may be implemented using software, hardware, and/or a combination of software and hardware where software may be stored in an appropriate storage medium and executed by one or more processors.

Figure 2:
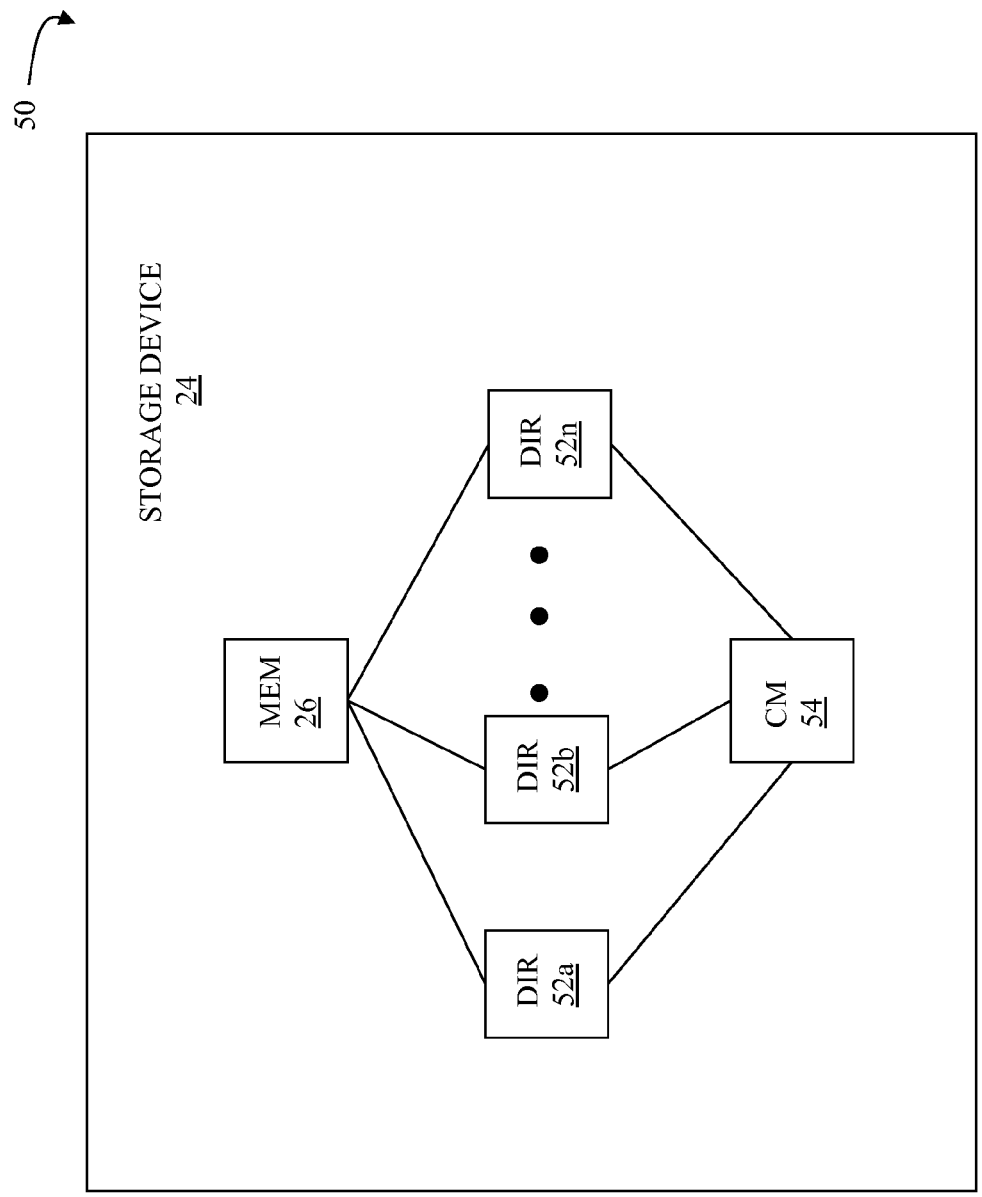
FIG. 2 is a schematic diagram showing a storage device, memory, a plurality of directors, and a communication module that may be used in connection with the system described herein.

Referring to FIG. 2, a diagram 50 illustrates an embodiment of the storage device 24 where each of a plurality of directors 52*a*-52*n* are coupled to the memory 26. Each of the directors 52*a*-52*n* represents one of the HAs 28*a*-28*n*, RAs 32*a*-32*n*, or DAs 38*a*-38*n*. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52*a*-52*n*. Each of the directors 52*a*-52*n* may be coupled to the CM 54 so that any one of the directors 52*a*-52*n* may send a message and/or data to any other one of the directors 52*a*-52*n* without needing to go through the memory 26. The CM 54 may be implemented using conventional MUX/router technology where a sending one of the directors 52*a*-52*n* provides an appropriate address to cause a message and/or data to be received by an intended receiving one of the directors 52*a*-52*n*. Some or all of the functionality of the CM 54 may be implemented using one or more of the directors 52*a*-52*n* so that, for example, the directors 52*a*-52*n* may be interconnected directly with the interconnection functionality being provided on each of the directors 52*a*-52*n*. In addition, a sending one of the directors 52*a*-52*n* may be able to broadcast a message to all of the other directors 52*a*-52*n* at the same time.

In some embodiments, one or more of the directors 52*a*-52*n* may have multiple processor systems thereon and thus may be able to perform functions for multiple directors. In some embodiments, at least one of the directors 52*a*-52*n* having multiple processor systems thereon may simultaneously perform the functions of at least two different types of directors (e.g., an HA and a DA). Furthermore, in some embodiments, at least one of the directors 52*a*-52*n* having multiple processor systems thereon may simultaneously perform the functions of at least one type of director and perform other processing with the other processing system. In addition, all or at least part of the global memory 26 may be provided on one or more of the directors 52*a*-52*n* and shared with other ones of the directors 52*a*-52*n*.

Figure 3:
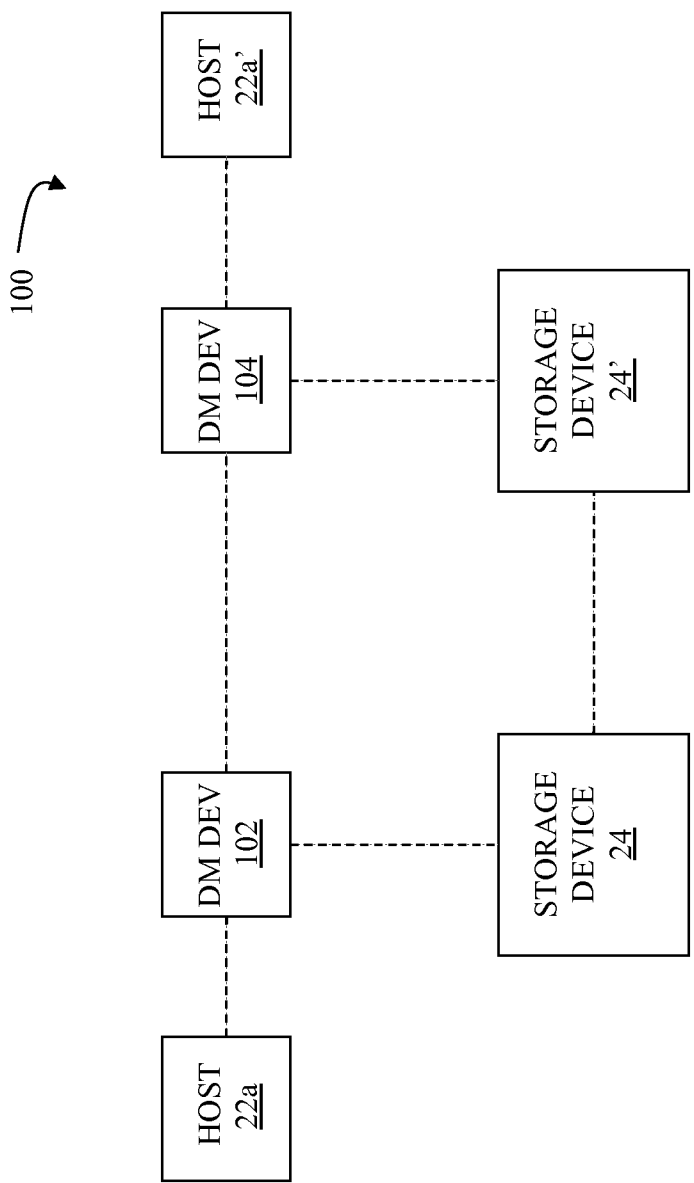
FIG. 3 is a schematic diagram illustrating a host accessing data on storage devices using data management devices according to an embodiment of the system described herein.

Referring to FIG. 3, a diagram 100 illustrates the host 22*a* and the storage device 24 in a different configuration than that shown in FIG. 1. The storage device 24 is coupled to a second storage device 24' using, or example, RDF or some other appropriate mechanism for transferring data between the storage devices 24, 24' as set forth herein. The storage devices 24, 24' may be in different physical geographic locations (e.g., the storage device 24 is in New York and the storage device 24' is in San Francisco). The storage devices 24, 24' may also be in the same geographic location but correspond to separate devices in, for example, the same facility.

The storage device 24 is coupled to a data management device 102 while the storage device 24' is coupled to a data management device 104. The host 22*a* may be coupled to the data management device 102. A different host 22*a*' may be coupled to the data management device 104. The data management devices 102, 104 may provide transparent access to the storage devices 24, 24' such that the host 22*a* (and/or another external device coupled to the system, such as the host 22*a*') do not need information about where the data is physically stored on the system (i.e., on the storage device 24 or on the storage device 24'). The data management devices 24, 24' present the data to external devices in a way that is independent of the physical location of the data. The data management devices 102, 104 may be provided using, for example, the VPlex product of EMC Corporation of Hopkinton, Mass. Of course, the system described herein may use different, but similar, devices to provide the functionality described herein.

The host 22*a* may access data that is physically stored on either the storage device 24 or the storage device 24'. The data management device 102 (and possibly the data management device 104) handle physical placement and access of the data so that the data may be presented to the host 22*a* in the same manner irrespective of the underlying physical location of the data. In addition, the way the host 22*a* accesses the data may be the same irrespective of whether the data has been moved from one of the storage devices 24 to another one of the storage devices 24'. For example, if the host accesses data on LUN A at time t1, and the location for physical data for LUN A is then moved after t1 but before a time t2, the host 22*a* may still access the data in the same way at the time t2 irrespective of the physical data having been moved to a different geographic location. The data management devices 102, 104 provide transparency to the host 22*a* with respect to the physical location of the data. Similar functionality may be provided for the host 22*a*'.

It is desirable to select and move the most active data from one physical location to another. In an embodiment herein, a user may manually provide input to specify and direct which of the storage devices 24, 24' contains physical data corresponding to one or more of the LUNs. The user input may be provided using any appropriate mechanism, including conventional mechanisms known in the art such as a GUI, command line interface, data file, etc. It is also possible to use one or more appropriate automated mechanisms to direct the physical geographic location of data, such as an automated process that keeps track of the physical location(s) of host(s) accessing the data that place the data in a geographic location that is closest to the host(s). Other automated mechanisms are possible. Also, it may be possible to combine manual and automated processes. For example, an automated mechanism may initially determine physical geographic location(s) for data, but a user may manually override the initial determination.

In an embodiment herein, the system may determine which data to move using algorithms described in U.S. patent application Ser. No. 11/823,156 by Burke, et al. titled "FINE GRAINED TIERED STORAGE WITH THIN PROVISIONING", which is incorporated by reference herein. See also U.S. patent application Ser. No. 11/903,869 by Veprinsky, et al. titled "DATA DE-DUPLICATION USING THIN PROVISIONING", which is also incorporated by reference herein. Of course, any appropriate algorithm/ technique may be used. In some cases, the access information may be process off-line to obtain useful access statistics. In addition, it may be possible to anticipate usage based on historical access information. For example, data for a particular database may become especially active on weekdays between 9:00 a.m. and 5:00 p.m. and otherwise may be relatively inactive. In such a case, it may be possible to pre-configure the physical location of data prior to 9:00 a.m. based on expected usage. The data that is moved may be referred to as the "working set".

It is also possible to provide one or more virtual machines (VM) that may be moved from one of the hosts 22*a*, 22*a*' to another one of the hosts 22*a*, 22*a*'. A virtual machine (VM) corresponds to an image of a runtime environment that may be executed on different physical hardware (e.g., different hosts). A VM may be suspended (paused) on a first processor and restarted on a different processor by moving the image of the runtime environment. Thus, for example, if a VM that processes payroll is initially provided on the host 22*a*, it is possible to move the VM for the payroll processing to the host 22*a*' if it becomes advantageous (e.g., due to cost, processor availability, security, bandwidth, etc.).

Thus, the system described herein may be used to pick data to be moved by certain criteria, one of which is expected activity level. By moving only the very busy data, it is possible to achieve load balancing (or load optimization) by moving only small portions of data. For example, a large database at a relatively busy site may be twenty terabytes, but the active portion may be only two terabytes. The system described herein provides a mechanism to make it possible move the two active terabytes (and/or a corresponding VM) to another location that is perhaps less busy. Thus, load balancing may be achieved without having to move the entire twenty terabyte database.

Figure 4:
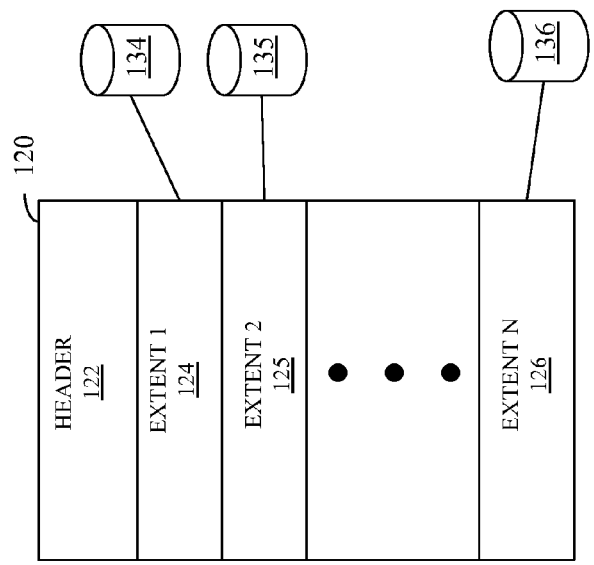
FIG. 4 is a schematic diagram illustrating an extent table and physical storage according to an embodiment of the system described herein.

Referring to FIG. 4, a file control block 120 for an LUN is shown as including a header 122 and a plurality of extent elements 124-126. The header 122 may contain file overhead information, such as the file name, creation date, access privileges, etc. The specific data provided in the header 122 is implementation dependent and can include any appropriate data. The extent elements 124-126 represent physical storage for different subsections of the LUN and may be provided in a data structure such as a table or a linked list.

Each of the elements 124-126 includes a logical address range (offset from the start of the LUN) and a pointer to one of a plurality of corresponding physical storage elements 134-136. The extent elements 124-126 map logical addresses to physical addresses of the physical storage elements 134-136. The extent element 124 points to the physical storage element 134, the extent element 125 points to the physical storage element 135, and the extent element 126 points to the physical storage element 136. Note that, although only three extent elements 124-126 and three physical storage elements 134-136 are shown, the system described herein includes any number of elements.

The logical address range indicates a portion of logical storage space of the LUN that is stored on the corresponding physical storage element. The extent elements 124-126 may be used to translate logical addresses to physical addresses. Thus, for example, if a particular one of the extent elements 124-126 indicates a logical address range of 500-1000 and indicates a corresponding physical address of location A on device B, then, according to the extent element, the data corresponding to logical address 600 could be accessed at location A+100 on device B. Of course, any appropriate mechanism/convention may be used to facilitate the extent elements 124-126 being used to translate logical address space to physical address space.

In an embodiment herein, the corresponding physical elements 134-136 may be provided by contiguous physical space, non-contiguous physical space, and/or physical space on different physical devices (from each other). Accordingly, a first range of logical addresses may correspond to data on a first physical device while a second rage of logical addresses may correspond to data on a second, different, physical device. It is possible for the physical devices to be at different geographic locations and/or storage devices so that, for example, data for a first range of logical addresses may be on the storage device 24 while data for a second range of logical addresses may be on the storage device 24' and, possibly, the storage devices 24, 24' may be in different geographic locations.

An appropriate mechanism, such as the data management devices 102, 104 may cause the physical location of the data to be transparent to a user accessing the data, such as the host 22*a* (and/or one or more other entities). Thus, in the employee payroll example provided above, physical data for a LUN containing employee records may usually be provided on one of the storage devices 24, 24' while one or more subsets of the data corresponding to payroll information may be temporarily moved to the other one of the storage devices 24, 24' whenever payroll processing is performed (e.g., every Thursday night at 11:00 p.m.). The employee information may remain in a single LUN and a portion of the physical data may be moved by, inter alia, modifying the extent elements 124-126 for logical data range(s) corresponding to the payroll information and copying the data from one physical location to another.

Figure 5:
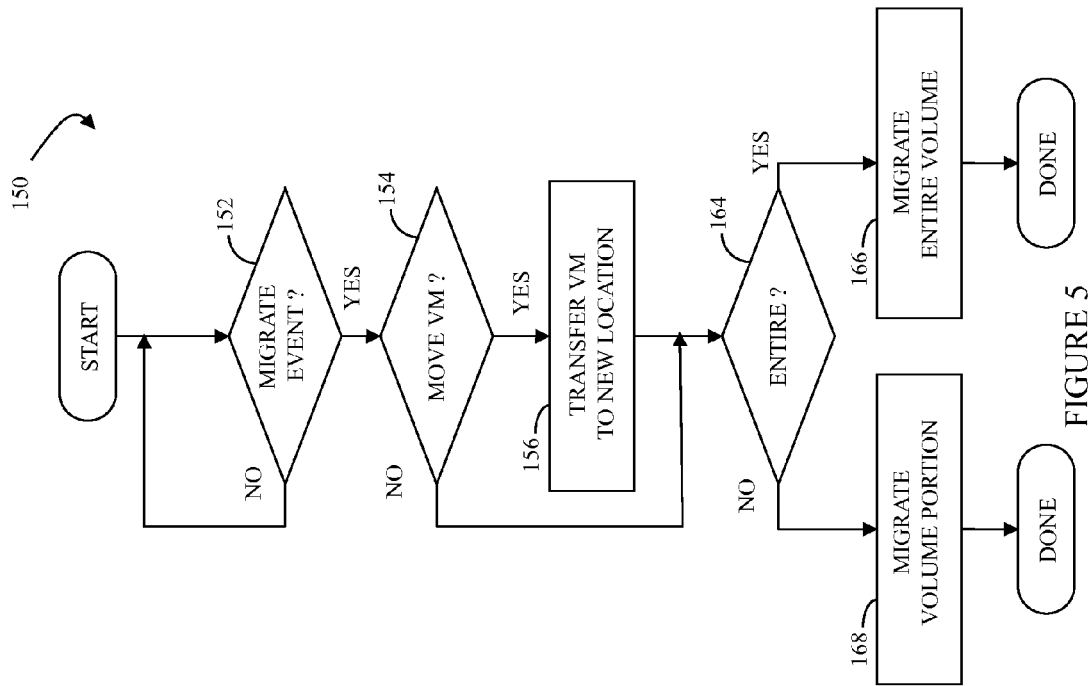
FIG. 5 is a flow chart illustrating steps performed in connection with migrating physical data according to an embodiment of the system described herein.

Referring to FIG. 5, a flow chart 150 illustrates steps performed in connection with migrating physical data for a LUN. The processing may be performed by any appropriate device in the system, such as the storage devices 24, 24' and/or one or more of the data management devices 102, 104. Processing begins at a first test step 152 where it is determined if a migration event has occurred. As discussed elsewhere herein, migration of physical data may be automatic, manual (initiated by a user), or some combination of both. Note also that, in some cases all data may be moved ahead of time (prior to processing at the remote site) while in other cases, some data may be moved prior to processing while other data is moved during processing (e.g., in response to being accessed). Furthermore, in some cases, changes to the data are written back to the initial site while in other cases, all of the work is performed at the remote site prior to moving the data back to the initial site. Irrespective of the mechanism used to cause data migration, the test at the step 152 determines if migration is to occur. If not, then control transfer back to the step 152 to make the determination again. The test at the step 152 is essentially a polling loop waiting for a migration event to cause initiation of data migration.

If it is determined at the step 152 that a data migration event has occurred (i.e., there is data to move from one physical device to another), then control transfers from the step 152 is a test step 154 where it is determined if one or more virtual machines are being transferred along with the data. In some cases, it is advantageous to move both the data and the corresponding VM that operates on the data while in other embodiments, it is advantageous to move only the data. The test at the step 154 determines if the VM is being moved. If so, then control transfers from the step 154 to a step 156 where the VM is transferred to a new location (e.g., a different host). Transferring the VM at the step 156 may be performed using any appropriate technique, including conventional techniques known in the art.

Following the step 156 (or following the step 154 if it is determined that the VM is not being moved) is a test step 164 where it is determined if all of the physical data for the LUN is being moved (i.e., whether the migration is a conventional physical data migration). If so, then control transfers from the step 164 to a step 166 where data corresponding to the entire LUN is migrated from one physical location to another. Migrating physical data for an entire LUN is known in the art and any appropriate technique, including conventional data migration techniques, may be used at the step 166. Following the step 166, processing is complete.

If it is determined at the test step 164 that only some of the data for the LUN is being moved from one physical location to another, then control transfers from the test step 164 to a step 168 where a migration of some of the physical data is performed. Processing at the step 168 is described in more detail elsewhere herein. Note that, after performing the processing illustrated by the step 168, some of the data for the LUN is provided on one physical device while different data for the LUN is provided on a different physical device. Some data for a LUN is moved from an initial physical device to a remote physical device while other data is maintained indefinitely at the first physical device (i.e., is not moved). Unlike prior art migration systems where all data for a LUN is eventually moved to a particular physical device, the system described herein provides that some data for a LUN is moved while other data is maintained indefinitely at its initial location (i.e., not moved). As discussed elsewhere herein, the physical devices may be different storage devices in the same geographic location or may be in different geographic locations. Following the step 168, processing is complete.

Figure 6:
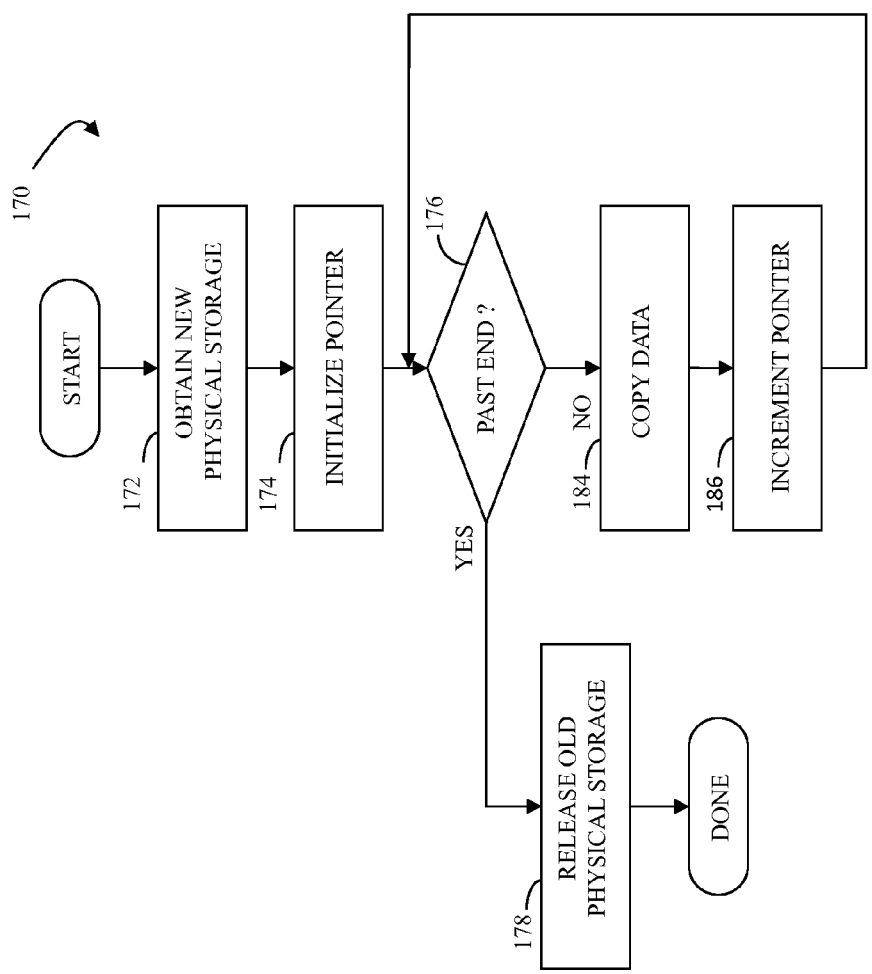
FIG. 6 is a flow chart illustrating steps performed in connection with migrating physical data for a portion of a LUN according to an embodiment of the system described herein.

Referring to FIG. 6, a flow chart 170 illustrates steps performed in connection with the processing provided in the step 168, described above, where data for a portion of a LUN is migrated from one physical location to another. Processing begins at a first step 172 where the new physical storage space is obtained (reserved). In an embodiment herein, available physical storage space may be managed in a pool using appropriate management techniques, such as conventional techniques that keep track of portions of the physical storage that are used and unused. Following the step 172 is a step 174 where a pointer that is used to iterate through the data is initialized. In some embodiments, two pointers may be used (a source pointer and a destination pointer).

Following the step 174 is a test step 176 where it is determined if the pointer used to iterate through the data points past the end (i.e., all the data has been processed and the migration is complete). If so, then control transfers from the test step 176 to a step 178 where the physical location at which the data had been stored (the source of the data for the migration) is released. In an embodiment herein, the physical location may be placed back into a pool of available physical data storage using an appropriate storage pool management mechanism. Following the step 178, processing is complete.

If it is determined at the test step 176 that more physical data is to be migrated, then control transfers from the test step 176 to a step 184 where the data is copied from the old (source) physical location to the new (destination) physical location. Following the step 184 is a step 186 where the iteration pointer is incremented. Following the step 186, control transfers back to the step 176, discussed above, for another iteration.

Figure 7:
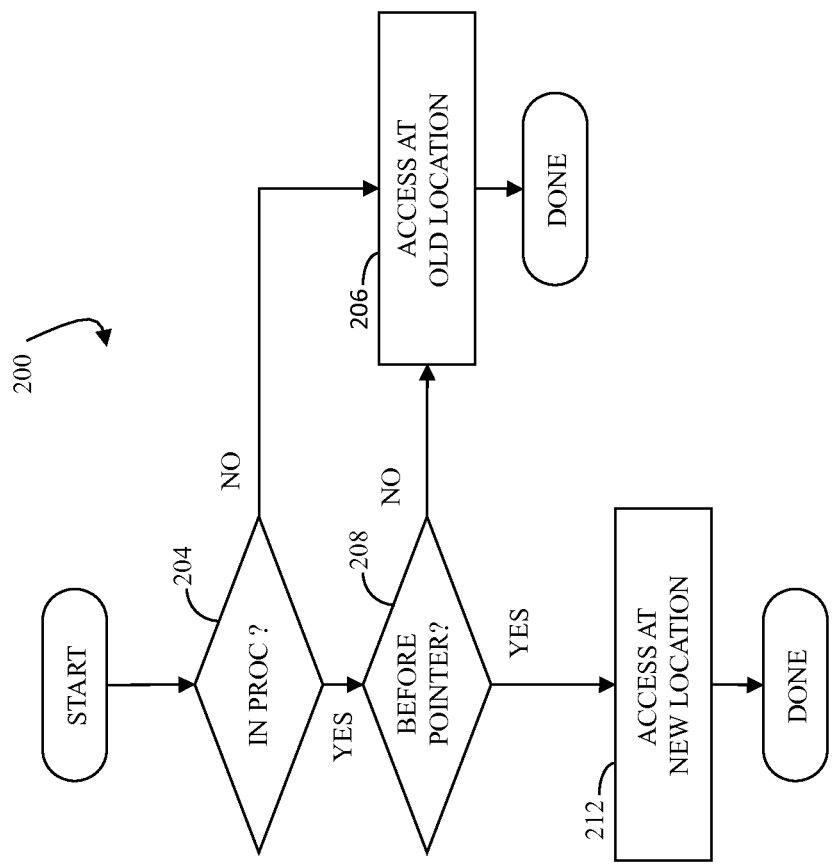
FIG. 7 is a flow chart illustrating steps performed in connection with an external process accessing physical data during migration of physical data for a portion of a LUN according to an embodiment of the system described herein.

Referring to FIG. 7, a flow chart 200 illustrates processing performed in connection with an external processes (e.g., a read or write process) accesses data on a LUN while processing is being performed to migrate a portion of the data of the LUN. Processing begins at a first test step 204 where it is determined if a data migration is currently in process for the extent. If not, then control transfers from the step 204 to a step 206 where the data for the extent is accessed using the old (source) physical location. That is, if no data migration is currently being performed for the extent, then no special processing is needed for accessing the corresponding data. If it is determined at the step 204 that the extent corresponds to data being migrated, then control transfers from the test step 204 to a test step 208 where it is determined if the data being accessed is before the iteration pointer used in connection with migrating the data (described above). Note that if the data being accessed is before (has a lower address) than the iteration pointer, then the data has already be migrated. On the other hand, if the data being accessed is located after the iteration pointer, then the data has not yet been migrated. Note also that a different appropriate test may be used at the step 208 to determine if the data being accessed has already been migrated.

If it is determined at the test step 208 that the data being accessed has already been migrated, then control transfers from the test step 208 to a step 212 where the new (destination) physical location is used to access the data. Following the step 212, processing is complete. If it is determined at the test step 208 that the data being accessed is not before the iteration pointer used to migrate the data (the physical data has not yet been migrated), then control transfers from the test step 208 to the step 206, discussed above, where the data is accessed in the old (source) physical location. Following the step 206, processing is complete.

Note that, in some instances, the order of steps in the flowcharts may be modified, where appropriate. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein. The system described herein includes computer software, in a non-transitory computer readable medium, that executes any of the steps described herein.

While the invention has been disclosed in connection with various embodiments, modifications thereon will be readily apparent to those skilled in the art. Accordingly, the spirit and scope of the invention is set forth in the following claims.

What is claimed is:

1. A method of migrating data for a logical device, comprising:
   subdividing the logical device into subsections for use with migrating the data, wherein each of the subsections corresponds to a particular address range of the logical device that is mapped to a physical device containing corresponding data;
   copying data for a particular subsection from a first physical device to a second, different, physical device, wherein the data of the particular subsection that is copied to the second physical device is scheduled for temporary storage on the second physical device as a working set copy of the data of the particular subsection for input/output (I/O) processing for a time period corresponding to expected higher activity level based on historical access information;

during the time period, servicing received I/O requests for the data of the particular subsection using the working set copy of the data of the particular subsection present on the second physical device;

after the time period, updating the data for the particular subsection present on the first physical device using the working set copy of the data for the particular subsection present on the second physical device as modified by any received I/O requests; and releasing memory used to store the working set copy of the data of the particular subsection on the second physical device after updating the data for the particular subsection present on the first physical device.

2. A method, according to claim 1, wherein the first physical device is provided in a different geographic location than the second physical device.

3. A method, according to claim 1, wherein the subsections are extents and wherein each of the extents includes information that maps logical address space into physical address space.

4. A method, according to claim 1, wherein automated algorithms are used to determine data in the particular subsection.

5. A method, according to claim 4, wherein the automated algorithms use expected activity level to determine data in the particular subsection.

6. A method, according to claim 1, wherein data in the particular subsection is copied back to the first physical device.

7. A method, according to claim 1, wherein a data management device presents data to an external device in a way that is independent of the physical location of the data and wherein the external device is a host coupled to the data management device.

8. Computer software, provided in a non-transitory computer-readable medium, that migrates data for a logical device, the computer software comprising:

executable code that accesses subsections of the logical device for use with migrating the data, wherein each of the subsections corresponds to a particular address range of the logical device that is mapped to a physical device containing corresponding data;

executable code that copies data for a particular subsection from a first physical device to a second, different, physical device, wherein the data of the particular subsection that is copied to the second physical device is scheduled for temporary storage on the second physical device as a working set copy of the data of the particular subsection for input/output (I/O) processing for a time period corresponding to expected higher activity level based on historical access information;

executable code that, during the time period, services received I/O requests for the data of the particular subsection using the working set copy of the data of the particular subsection present on the second physical device;

executable code that, after the time period, updates the data for the particular subsection present on the first physical device using the working set copy of the data for the particular subsection present on the second physical device as modified by any received I/O requests; and executable code that releases memory used to store the working set copy of the data of the particular subsection on the second physical device after updating the data for the particular subsection present on the first physical device.

9. Computer software, according to claim 8, wherein the first physical device is provided in a different geographic location than the second physical device.

10. Computer software, according to claim 8, wherein the subsections are extents and wherein each of the extents includes information that maps logical address space into physical address space.

11. Computer software, according to claim 8, wherein automated algorithms are used to determine data in the particular subsection.

12. Computer software, according to claim 11, wherein the automated algorithms use expected activity level to determine data in the particular subsection.

13. Computer software, according to claim 8, further comprising:

executable code that copies data in the particular subsection back to the first physical device.

14. Computer software, according to claim 8, wherein a data management device presents data to an external device in a way that is independent of the physical location of the data and wherein the external device is a host coupled to the data management device.

15. A system, comprising:

a first storage device;

a second storage device coupled to the first storage device;

at least one data management device, coupled to at least the first storage device, wherein the data management device includes computer software that migrates data for a logical device, the computer software including executable code that accesses subsections of the logical device for use with migrating the data, wherein each of the subsections corresponds to a particular address range of the logical device that is mapped to physical storage containing corresponding data and including executable code that copies data for a particular subsection from the physical storage of the first storage device to physical storage of the second storage device, wherein the data of the particular subsection that is copied to the second physical device is scheduled for temporary storage on the second physical device as a working set copy of the data of the particular subsection for input/output (I/O) processing for a time period corresponding to expected higher activity level based on historical access information and including executable code that, during the time period, services received I/O requests for the data of the particular subsection using the working set copy of the data of the particular subsection present on the second physical device, executable code that, after the time period, updates the data for the particular subsection present on the first physical device using the working set copy of the data for the particular subsection present on the second physical device as modified by any received I/O requests, and executable code that releases memory used to store the working set copy of the data of the particular subsection on the second physical device after updating the data for the particular subsection present on the first physical device.

16. The system, according to claim 15, wherein the first storage device is provided in a different geographic location than the second storage device.

17. A system, according to claim 15, wherein the subsections are extents and wherein each of the extents includes information that maps logical address space into physical address space.

18. A system, according to claim 15, wherein automated algorithms are used to determine data in the particular subsection.

19. A system, according to claim 18, wherein the automated algorithms use expected activity level to determine data in the particular subsection.

20. A system, according to claim 15, wherein the data management device presents data to an external device in a way that is independent of the physical location of the data and wherein the external device is a host coupled to the data management device.

\* \* \* \* \*